United States Patent

[11] 3,552,562

[72] Inventor Morton Silverberg
Pittsford, N.Y.

[21] Appl. No. 681,688

[22] Filed Nov. 9, 1967

[45] Patented Jan. 5, 1971

[73] Assignee Xerox Corporation
Rochester, N.Y.
a corporation of New York

[54] RANDOM ACCESS RETRIEVAL SYSTEM
3 Claims, 5 Drawing Figs.

[52] U.S. Cl. ........ 209/80.5

[51] Int. Cl. ........ B07c 3/10

[50] Field of Search ........ 209/80.5, 110.5

[56] References Cited

UNITED STATES PATENTS

| | | | |
|---|---|---|---|
| 1,744,373 | 1/1930 | Erich | 209/80.5 |
| 2,090,635 | 8/1937 | Nevin | 209/80.5 |

*Primary Examiner*—Richard A. Schacher

*Attorneys*—Frank A. Steinhilper, Ronald Zibelli and James J. Ralabate

ABSTRACT: An edge-notched card retrieval system wherein a first group of interposer rods selectively and sequentially interrogate the code positions along one edge of a group of cards while a second group of interposer rods interrogate the code positions along another edge which is perpendicular to the first-mentioned edge. The coded card has at least two perpendicular edges bearing code notches and/or teeth. The code on one edge is the complement of the code on the other edge.

PATENTED JAN 5 1971 3,552,562

SHEET 1 OF 2

INVENTOR.
MORTON SILVERBERG
BY Ronald Zibelli

ATTORNEYS

PATENTED JAN 5 1971 3,552,562

SHEET 2 OF 2

INVENTOR.
MORTON SILVERBERG
BY Ronald Zibelli
ATTORNEYS

RANDOM ACCESS RETRIEVAL SYSTEM

This invention relates to random access retrieval systems generally, and, specifically, to retrieval systems for information bearing members in the form of planar cards coded with edge notches.

Present commercial information storage systems are increasingly employing small modular units which house magazines of information bearing members, such as data processing cards. The information itself may be a xerographically or photographically produced micro or semimicro image of a document, or a pattern of coded perforations. Whatever the nature of the information, it is desirable to retrieve a particular information bearing member or card quickly and accurately.

While accuracy is a requirement of such a system, it is also a desirable feature to code such cards as compactly as possible to permit large storage capacities.

In addition, physical size of the retrieval unit preferably should be minimized to accommodate desk top locations for use directly in the normally low noise environment of an office or library.

Prior art systems have many inherent disadvantages which are not common to the invention hereinafter described.

Generally, prior art retrieval systems are not capable of accurately retrieving only the desired card, especially when the edge thereof is coded in a binary number manner. In many such cases, the desired card is retrieved along with undesired cards whose binary codes differ from the code of the desired card by the absence of, for instance, binary ones in the code areas where the desired card is so coded. For example, if the desired card is coded 010101, then those cards coded 000001, 000101, 010000, and 010001 are also retrieved with the desired card.

However, to prevent this, certain prior art card retrieval systems have used a sequential interrogating technique. In this system, the original group of cards are interrogated at one code area and then separated into two subgroups, one of which contains the desired card. This subgroup is then interrogated and subdivided. This process is repeated until the last subgroup divided out contains only the desired card. One disadvantage of this system is the inordinate amount of space needed to finally achieve the desired retrieval after a succession of these subdivisions.

Further prior art retrieval systems lack a positive force to effect retrieval and must depend on the inconsistent effects of gravity and air turbulence to reduce intercard friction.

Also, it is desirable to have the capabilities of retrieving planar information bearing members which may vary slightly or significantly in physical dimensions. Prior art systems generally are restricted to a definite card size for successful operation.

Therefore, it is an object of the present invention to provide an improved retrieval apparatus which operates efficiently on information bearing cards of various sizes.

It is a further object of the present invention to improve retrieval apparatus wherein a positive force is utilized in the retrieval process.

A still further object of the present invention is to provide an improved retrieval apparatus which is mechanically simple and compact while accurate in the retrieval operation.

These and other objects as may become apparent are achieved in accordance with the principles of the present invention wherein a first group of interposer rods selectively and sequentially interrogate the code positions along one edge of a group of cards while a second group of interposer rods interrogate the code positions along another edge which is perpendicular to the first mentioned edge. The coded card has at least two perpendicular edges bearing code notches and/or teeth. The code on one edge is the compliment of the code on the other edge.

For a better understanding of the present invention, as well as other objects and features thereof, reference may be made to the following description to be read in connection with the accompanying drawings wherein.

Figure 1:
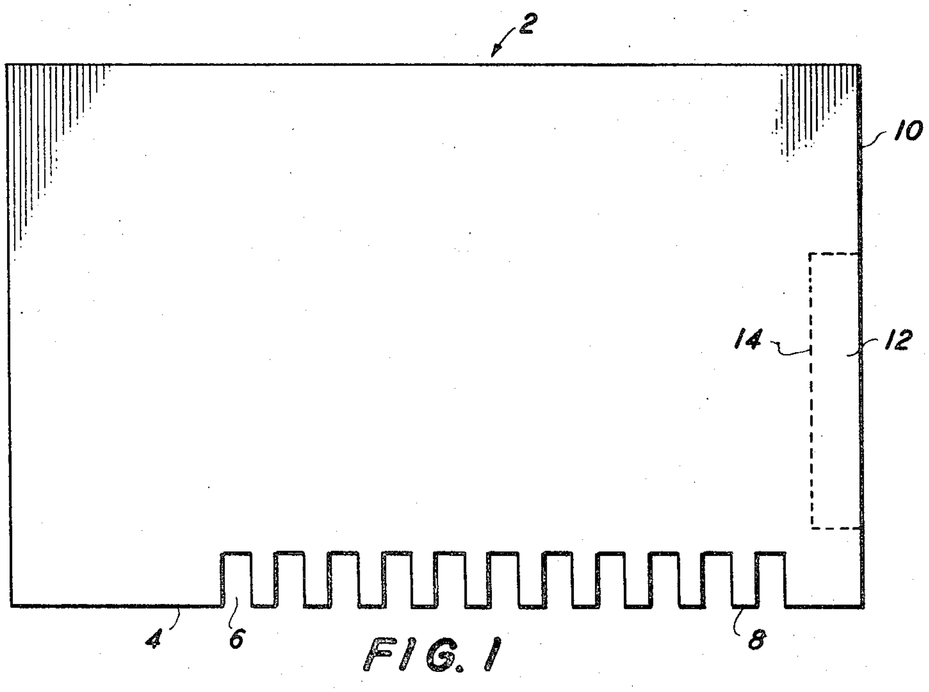
FIG. 1 illustrates an uncoded card applicable to the concepts of the present invention.

Before reference is made to the figures of the drawing with a detailed description thereof, it should be recognized that reference will be made to simple binary codes to characterize individual cards to be retrieved for purposes of description only. A conventional M out of N code may also be utilized wherein each group of possible combinations may represent one digit in a decimal number. Therefore, the term "set" will be used to designate either a single binary digit or a plurality of binary digits which may represent one element in a particular card's code.

FIG. 1 illustrates a simple uncoded card 2 preferably in rectangular configuration wherein one edge 4, referred to hereinafter as the horizontal edge, is provided with a regular pattern of alternating notches 6 and teeth 8, the teeth representing a code area or position. Another edge 10 of this card which is perpendicular to the aforementioned horizontal edge, referred to hereinafter as the vertical edge, is provided with a code area 12 enclosed by a portion of this edge and a broken line 14. It should be noted that the depth of this code area from the vertical edge or the dimension of the code area in a direction parallel to the horizontal edge is equal to or greater than the space along the horizontal edge occupied by a tooth and an adjacent notch. To code the card as shown in FIG. 1, it is only necessary to notch the vertical edge 10 in the code area in accordance to the desired coding scheme which, in this example, is a simple binary number. For purposes of illustration, assume that the code is 0000101010. The horizontal edge 4 of the card in FIG. 1 is provided with a complementary form of the desired code. This is implemented by removing the teeth at those code positions corresponding to the code positions along the vertical edge which have not been notched. This may better be seen with reference to FIG. 2.

Figure 2:
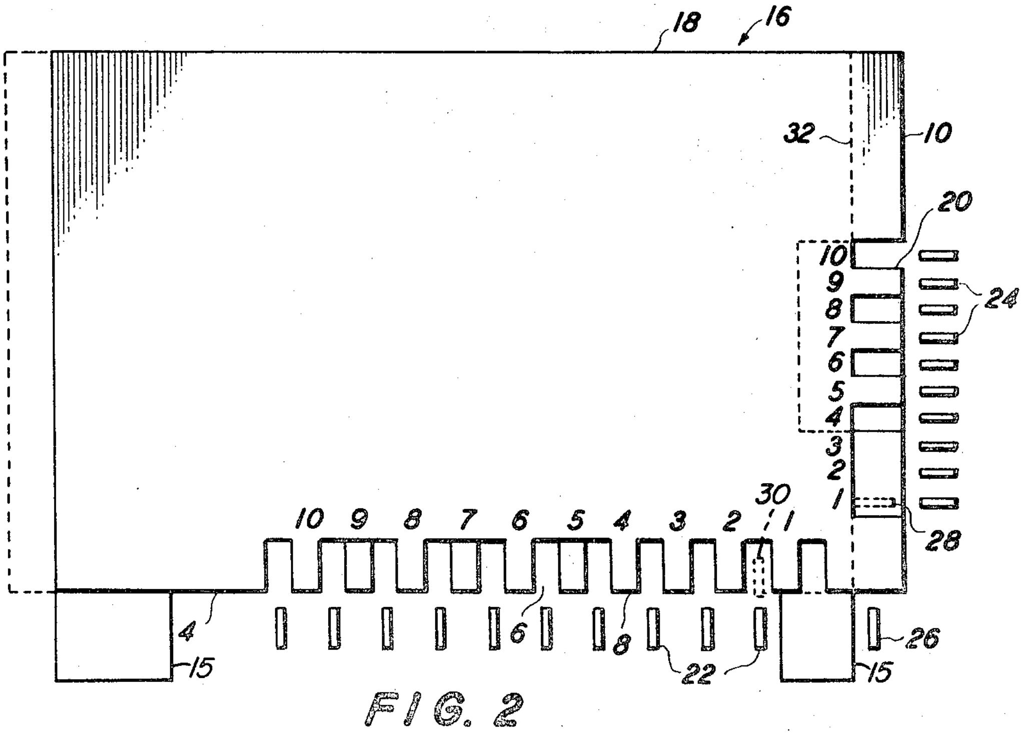
FIG. 2 illustrates schematically the retrieval apparatus of the present invention with three coded cards in retrieval position at one stage in the actual retrieval operation.

Referring now to FIG. 2, there is shown an apparatus in schematic form for implementing a retrieval operation employing the concepts of the present invention. A group 16 of three superimposed coded cards are positioned by way of a support member 15 (shown only in FIG. 2) relative to the retrieval apparatus to permit selective retrieval of one of the cards.

Only three cards will be referred to in order to permit a clear explanation of the operation of the retrieval concept itself. It should be understood that any number of cards may be housed in one particular retrieval module depending, of course, upon the particular code used.

The top card 18 is completely shown in FIG. 2 and has been coded with the binary number 0000101010. The vertical edge of this card has three teeth 20 in the code area. A tooth in each code position to represent a binary one in the card's code number. Along the horizontal edge, three teeth have been removed in code positions corresponding to those positions along the vertical edge which are characterized by an existing tooth. From this description, the coding technique utilized in accordance with the principles of the present invention can be understood.

In addition to the card referred to in the foregoing paragraph, the two other cards superimposed with this card have been coded as follows: 0001010100 and 1110000000, respectively. To facilitate the following explanation, the code areas along the vertical and horizontal edges of the cards involved will be subdivided into 10 specific code areas which will be referred to as such. These areas are designated on the card which is visible in FIG. 2 by the numbers 1 through 10. To orient the foregoing explanation with this notation, the visible card in FIG. 2 has along its vertical edge teeth in the fifth, seventh, and ninth code areas and on the horizontal edge of the card teeth have been removed from the fifth, seventh and ninth code areas.

Also shown in FIG. 2 are two groups 22 and 24 of 10 interposer rods or shafts. Those interposer rods 22 associated with and adjacent to the horizontal edge will be referred to hereinafter as inhibit interposers while the group of interposer rods 24 associated with and adjacent to the vertical edge will be referred to as the interrogatory interposers. In addition to these groups of interposers, there is a retrieve interposer 26 associated with the horizontal edge of the cards and adjacent to the corner common to both the horizontal and vertical edges.

To retrieve the card coded 0000101010, the first step is to interrogate one code position along the vertical edge of the group of cards at a position corresponding to a normally notched code element in the code of the desired card. In this example, code positions 1, 2, 3, 4, 6, 8 and 10 should be notched along the vertical edge of the desired card. Therefore, one of these positions is interrogated by the synchronized movement of the inhibit and interrogatory interposers associated with the particular code area to be interrogated. The sequence of code areas interrogated is not critical. For purposes of this description the interrogations will be carried out sequentially from the first code position to the tenth code position. As shown in FIG. 2, the first code position has been interrogated and the position of the particular interposers during the interrogation are represented by the broken line outlines 28 and 30 associated with the vertical and horizontal edges of the card, respectively.

The inhibit interposer 30 moves initially into the notch intermediate the teeth at the first and second code positions along the horizontal edge. Immediately following this, the interrogatory interposer 28 proceeds in a direction parallel to the horizontal edge toward the first code position contacting those cards which have not been notched in the first code position. In the example, the card coded 1110000000 will be urged under the influence of this interrogatory interposer in the direction parallel to the horizontal edge. The movement of the interrogatory interposer is controlled so that the cards are moved by an amount equal to the tooth spacing along the vertical edge. As noted before, the tooth spacing is equal to the space occupied by a tooth 8 and adjacent notch 6 along the horizontal edge. Also, since the horizontal edge of card 1110000000 has had the tooth removed at the first code position, the inhibit interposer associated with the first code position on the horizontal edge will not inhibit the movement of this card under the influence of the aforementioned interrogatory interposer. As a result, the displacement of this card will take place and the card will be repositioned as indicated by the broken line 32 in FIG. 2 designating the vertical edge of this card.

Figure 3:
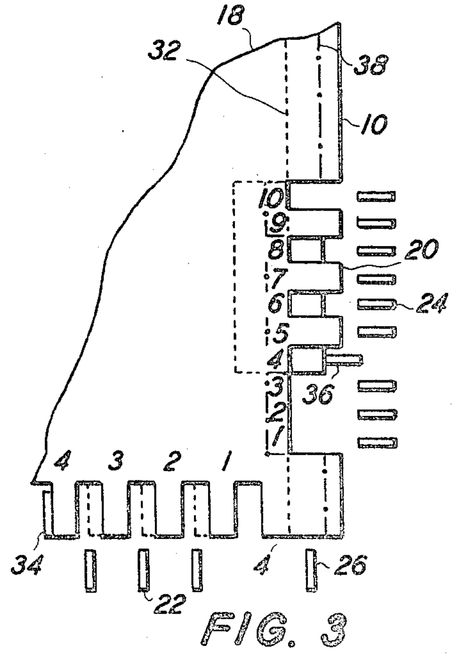
FIG. 3 illustrates another stage in the retrieval operation.

The interposers actuated during this first step in the retrieval process will then return to their original positions and the next code area which should correspond along the vertical edge to a notch in the desired card will now be interrogated. It is not necessary to repeat the description of this interrogation cycle for code positions 2 and 3 since, in the example, no cards will be contacted by the moving interrogatory interposers. However, since one of the cards not yet moved in the example is coded 0001010100, a tooth exists at the fourth code position along the vertical edge of this card. The interrogation of the fourth code position will now be described with reference to FIG. 3.

This figure illustrates a stage in the movement of the interrogatory interposer associated with the fourth code position. As shown, the inhibit interposer 34 is in position along the horizontal edge of the card intermediate the fourth and fifth code positions and the interrogatory interposer 36 has contacted card 0001010100 at the fourth code position. As shown by the dash-dot line 38 designating the vertical edge of this card, it is being displaced in a direction parallel to the horizontal edge as was the first displaced card.

The top card or desired card coded 0000101010 has not been moved from its initial position in the retrieval apparatus.

After this second card has been displaced the same amount as the first card, the only card remaining in its initial position is the desired card to be retrieved. At this point, it is sufficient to state that if more cards were in the group of cards to be operated on, the interrogation process would be repeated for as many code positions as there are notches on the vertical edge of the desired card to be retrieved. It is not necessary to describe these repeated cycles since they are very similar to the ones previously described. It is important, however, to note in FIG. 3 the teeth along the horizontal edge of the card presently being displaced in this FIG. to show how these teeth, when the card is displaced, move across the space provided between adjacent teeth along the horizontal edge. However, this is not the case with the fourth code position where the inhibit interposer has been placed. As noted before in the discussion of the coding of the cards, where there is a tooth on the vertical edge of the card, there is a notch or tooth removed in the corresponding code position on the horizontal edge. This feature provides a positive control over the cards not being displaced by the retrieval mechanism to insure that intercard friction does not degrade the retrieval process itself. For example, as this second card is being displaced, the tooth in the fourth code position on the horizontal edge of the card to be retrieved abuts the particular inhibit interposer 34 and resists the intercard friction which would normally urge it into displacement from its original position.

Figure 4:
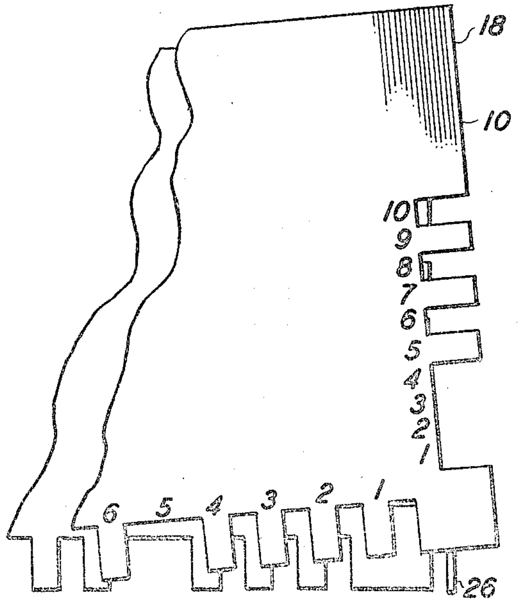
FIG. 4 illustrates the final step in the retrieval operation.
Figure 5:
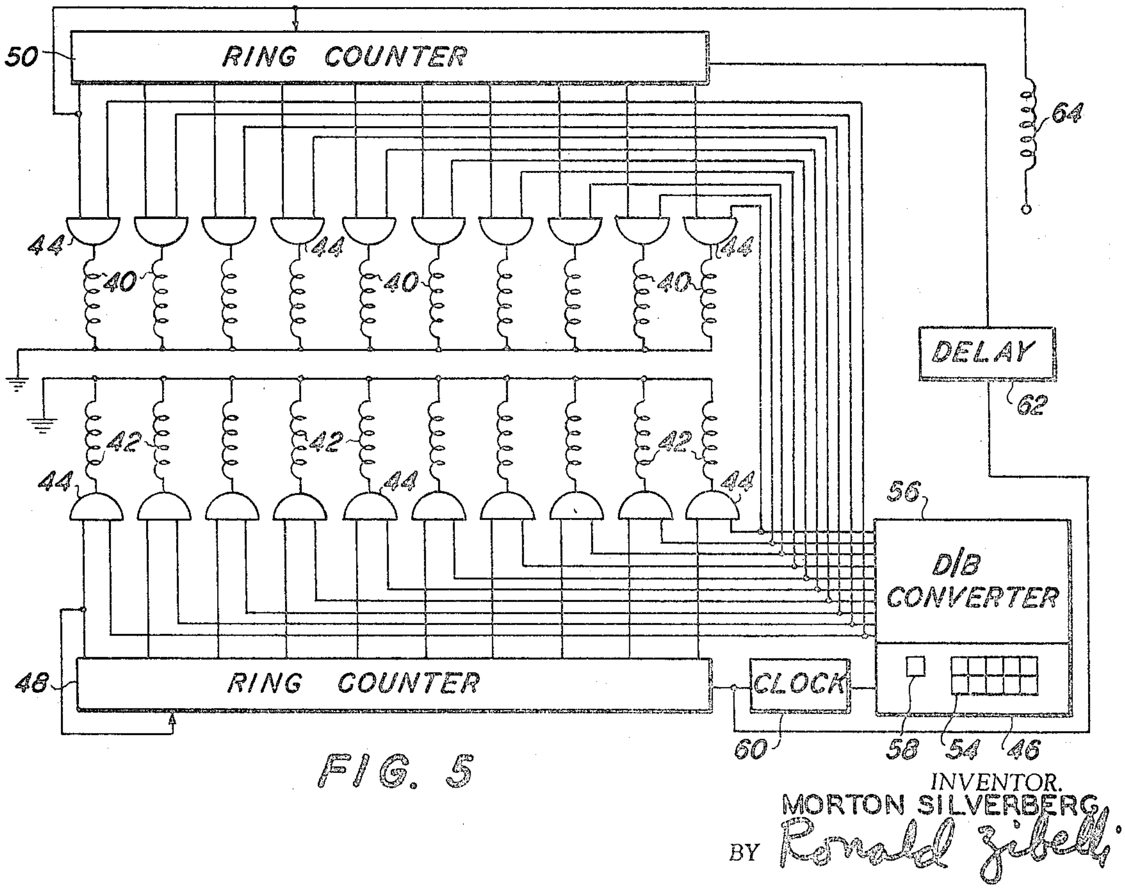
FIG. 5 illustrates schematically a circuit which may be used to implement the retrieval process in accordance with the principles of the present invention.

FIG. 4 shows the actual displacement of the retrieved card under the influence of the retrieve interposer 26 which, after the aforedescribed process of repeated interrogation has been completed, moves in a vertical direction to displace any card remaining in its initial position above the displaced cards for easy operator removal. Reference will now be made to the circuit of FIG. 5 which represents one circuit configuration possible to automate the interrogating and retrieval process previously described. A group of solenoids represented by coils 40 are individually associated each with a particular one of the interrogatory interposers and serve to actuate the interposer upon energization of the particular solenoid. Similarly, coils 42 represent solenoids which control the movement of inhibit interposers in a fashion similar to that of the interrogatory interposers. It is noted that these interposers may be spring loaded or otherwise adapted to return to their initial position upon deenergization of the actuating solenoid.

All of the coils 40 and 42 are driven by an associated AND gate 44 which has two inputs. One of these inputs is from a pulse distributor such as a ring counter and the other from a keyboard 46.

Ring counters 48 and 50 provide inputs to the AND gates associated with the inhibit and interrogatory interposers, respectively.

The keyboard 46 is of conventional design and may have a plurality of input keys 54 which may be depressed in a particular manner to enter the code of the card desired to be retrieved. The keyboard may also include a conventional decimal-to-binary converter 56 which can convert the decimal numbers associated with the respective keys into binary numbers used in a retrieval process. Also, keyboard 46 is provided with a retrieval key 58 which the operator depresses to initiate the actual retrieval of the desired card. In operation, a particular code is entered at the keyboard 46 which distributes the code in parallel to one input of each AND gate 44. Depending on the code, particular AND gates are enabled, for example, by a binary zero. Once this step has been completed, the operator may then press the retrieve button 58 in the FIG. to initiate a clock 60 of a suitable frequency which commences the sequential stepping of the ring counters 48 and 50.

It is noted, that the clock pulses provided to ring counter 50 are delayed through a conventional delay circuit 62 so as to insure that the inhibit interposer is in position before the particular interrogatory interposer is actuated.

Depending on which AND gates are enabled, the ring counters sequentially energize the coils which will accordingly actuate the particular interposers involved to carry out the retrieval process as previously described. Upon the completion of the operation of ring counter 50 another coil 64 is energized which actuates the retrieve interposer 26 previously alluded to in connection with FIG. 5. At this point, the retrieval process has been completed and the desired card is displaced for easy operator removal from the remaining cards in the retrieval module.

While the invention has been described with reference to the specific embodiment disclosed herein, it is not confined to the details set forth herein since it is apparent that certain electrical and mechanical equivalents may be substituted for the components disclosed without departing from the scope of the invention.

Therefore, it is intended to cover all such modifications or changes as may come within the scope of the invention as defined by the following claims.

I claim:

1. A random access card retrieval system for information bearing cards each having an edge-notched code along one edge thereof and a complementary coded edge substantially perpendicular to said one edge comprising:

a. a support structure for supporting a plurality of coded cards in substantial superimposition with each other;

b. a first set of interposer members equal in number to at least the number of code positions available on said one edge of said card and positioned relative to said plurality of cards to be capable of movement in a direction substantially parallel to said complementary coded edge a predetermined distance which is greater than the distance separating said interposer members and said one edge;

c. a second set of interposer members equal in number to at least the number of interposer members of said first set and uniformly spaced from said complementary coded edge;

d. actuating means responsive to a desired code of one of said cards for selectively moving one-by-one a predetermined plurality of the interposer members of said first set toward said one edge a distance equal to said predetermined distance, said predetermined distance being equal substantially to the spacing between adjacent interposer members of said second set; and e. actuating means responsive to a desired code of one of said cards for selectively moving one-by-one a number of said interposer members of said second set equal in number to said predetermined plurality toward said complementary coded edge a distance greater than the distance between said second set and said complementary coded edge, each interposer member of said second set so moved corresponding in relative position in the set with the interposer member moved in said first set.

2. A random access retrieval system for edge-notched information bearing members, each having at least two substantially perpendicular edges having N code positions, one of said edges being coded with a first combination of teeth and notches, said teeth and notches having a predetermined dimension in a direction parallel to said other one of said edges, said other one of said edges being coded with a second combination of teeth and notches which complement said combination on said one edge, said teeth and notches of said second combination being separated by a separator notch, comprising:

a. a N number of first interposer members arranged in a substantially linear row and spaced from but closely adjacent said one of said edges;

b. a N number of second interposer members arranged in a substantially linear row and spaced from but closely adjacent said other one of said edges; adjacent ones of said second interposer members being spaced apart by a distance substantially equal to said predetermined dimension;

c. first actuating means for inserting and removing selected ones of said second interposer members in a one-by-one sequence in selected ones of said separator notches in accordance with a particular code characteristic of the desired information bearing member; and d. second actuating means for moving selected ones of said first interposer members, in the same sequence as the second interposer members were moved, toward said one of said edges a distance substantially equal to the sum of the distance separating said first interposer members and said one of said edges and said predetermined dimension in accordance with said particular code characteristic of the desired information bearing member.

3. A system for retrieving randomly located information bearing members, each of which has one edge coded with a combination of teeth and notches and another edge substantially perpendicular thereto which is coded with a complementary combination of teeth and notches, comprising:

a. support means for supporting a plurality of said information bearing members in an initial position, said plurality being in substantial superimposition with each other;

b. interrogating means positioned along said one edge for moving undesired ones of said information bearing members from said initial position including 1. a set of interrogating interposer members arranged in a substantially linear row substantially uniformly spaced from said one edge, each of said interrogating interposer members associated with a tooth or notch in said one edge code combination; and, 2. actuating means for moving in a one-by-one sequence a predetermined number of said interrogating interposer members in a direction substantially parallel to said complementary coded edge a distance substantially equal to the sum of the distance separating said linear row and said one edge and the depth of a notch along said one edge, said predetermined number of said interrogating interposer members corresponding to those interposer members associated with a notch along said one edge of the information bearing member to be retrieved;

c. inhibiting means positioned along said complementary coded edge for selectively inhibiting movement of some of said information bearing members in accordance with a particular code which characterizes the information bearing member desired to be retrieved including 1. a set of inhibiting interposer members arranged in a substantially linear row uniformly spaced from said another edge, each of said inhibiting interposer members associated with a tooth or notch in said complementary code combination; and 2. actuating means for moving in said one-by-one sequence a number of said inhibiting interposer members equal to said predetermined number in a direction substantially parallel to said one edge a distance greater than the separation between said set of inhibiting interposer means and said another edge;

d. synchronization control means for controlling said actuating means and maintaining that each interrogating interposer member movement is preceded by a corresponding inhibiting interposer member movement.